United States Patent [19]
Yokoyama

[11] Patent Number: 5,390,756
[45] Date of Patent: Feb. 21, 1995

[54] CONSTANT SPEED CONTROL DEVICE

[75] Inventor: Etsuya Yokoyama, Hyogo, Japan

[73] Assignee: Mitsubishi Denki Kabushiki Kaisha, Tokyo, Japan

[21] Appl. No.: 19,259

[22] Filed: Feb. 18, 1993

[30] Foreign Application Priority Data

Feb. 28, 1992 [JP] Japan .................. 4-043066

[51] Int. Cl.$^6$ ............................................. B60K 31/00
[52] U.S. Cl. ............................ 180/178; 364/426.04
[58] Field of Search ............... 180/170, 175, 176, 177, 180/178, 179, 197; 364/424.01, 426.04

[56] References Cited

U.S. PATENT DOCUMENTS

| | | | |
|---|---|---|---|
| 4,566,709 | 1/1986 | Sano | 180/170 |
| 4,670,845 | 6/1987 | Etoh | 180/170 |
| 5,157,611 | 10/1992 | Ikeda et al. | 180/197 |
| 5,183,128 | 2/1993 | Ito et al. | 180/197 |
| 5,243,526 | 9/1993 | Ito et al. | 180/177 |
| 5,251,680 | 10/1993 | Minezawa et al. | 180/170 |

*Primary Examiner*—Richard M. Camby
*Attorney, Agent, or Firm*—Sughrue, Mion, Zinn, Macpeak & Seas

[57] ABSTRACT

A constant speed control device for controlling a vehicle speed in a constant speed, the device comprising a vehicle speed sensor for detecting an actual vehicle speed and a steering angle detecting means for detecting a steering angle of the vehicle. A running condition setting member is provided for setting at least one of an aimed vehicle speed for the constant speed control, an activation and cancellation of the constant speed control. A control member is provided for calculating controlled variables of the vehicle speed for the constant speed control on the basis of the steering angle and a deviation between the actual vehicle speed detected by the vehicle speed sensor and the aimed vehicle speed set by the running condition setting means, to perform the constant speed control. On the basis of at least one predetermined threshold of the steering angle information, the control member reduces the aimed vehicle speed and performs the constant speed control or cancels the constant speed control.

5 Claims, 3 Drawing Sheets

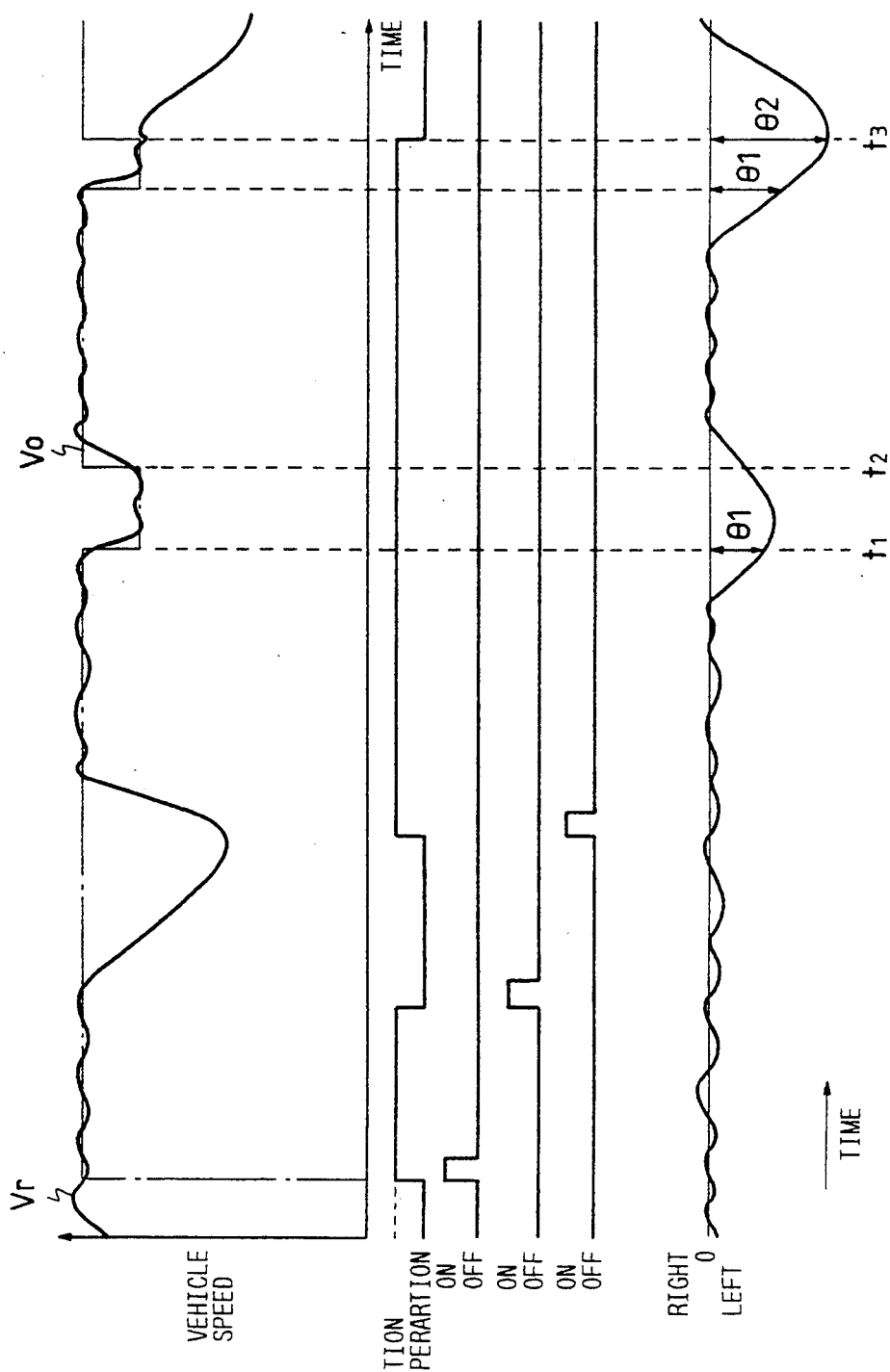

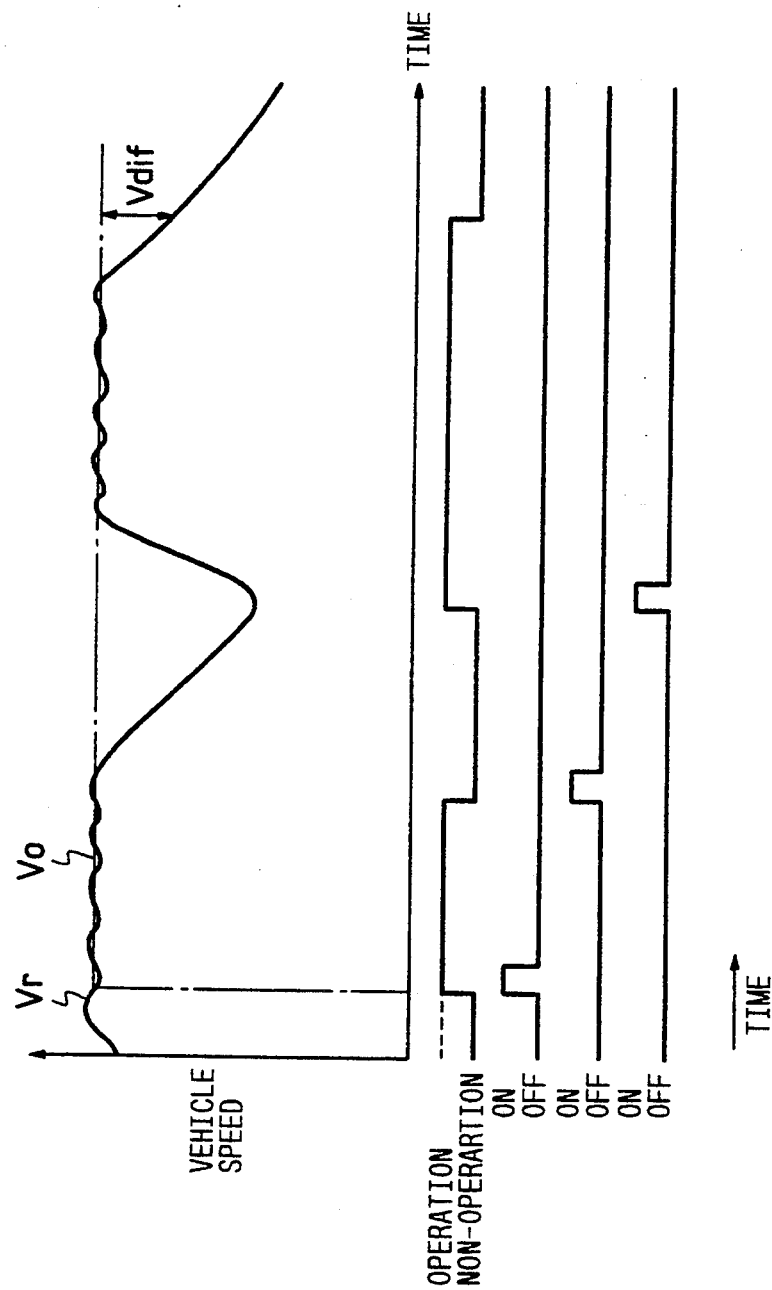

CONSTANT SPEED CONTROL DEVICE

BACKGROUND OF THE INVENTION

This invention relates to a constant speed control device which controls a vehicle so as to run at a constant speed, and particularly to an apparatus which performs a control in accordance with steering angle information.

FIG. 3 shows the configuration of a conventional constant speed control device. In FIG. 3, the conventional device is provided with a vehicle speed sensor 1 for detecting a vehicle speed, an electronic control unit 2A for the constant speed control (hereinafter, referred to as "constant speed ECU"), a throttle actuator 3 which drives a throttle valve for controlling the intake air amount to an engine, a main switch 41 for starting the constant speed operation, a set switch 42 for setting conditions of the constant speed operation, a cancel switch 43 for canceling the constant speed operation, and a brake switch 44 for canceling similarly the constant speed operation. The conventional constant speed control device consists of these components.

FIG. 4 shows operation timings of signal wave forms, etc. of various portions of the conventional constant speed control device as described above.

The operation of the conventional device will be described with reference to FIGS. 3 and 4 as below. When the main switch 41 is turned on as shown in FIG. 4(c), the constant speed state is activated as shown in FIG. 4(b). The ECU 2A for the constant speed control sets the vehicle speed which is detected by the vehicle speed sensor 1 at the time of this ON operation, as the aimed vehicle speed $V_o$ as shown in FIG. 4(a). Then, the ECU 2A for the constant speed control controls the throttle actuator 3 so that the actual vehicle speed $V_r$ (see FIG. 4(a)) is adjusted within a predetermined range regarding the aimed vehicle speed $V_o$.

When the cancel switch 43 or the brake switch 44 is turned on during the constant speed control as shown in FIG. 4(d), the ECU 2A for the constant speed control cancels the constant speed control. Thereafter, when the set switch 42 is turned ON as shown in FIG. 4(e), the ECU 2A for the constant speed control starts again the constant speed control.

In the case that an excessive load is applied to the engine (for example, the vehicle climbs a slope) during the above-mentioned constant speed control, even when the ECU 2A for the constant speed control drives the throttle actuator 3 at a maximum thereof so as to make the throttle valve open up, the actual vehicle speed $V_r$ may decrease to a lower level than the aimed vehicle speed $V_o$, resulting in that the difference between these speeds exceeds $V_{dif}$. In such a case, the ECU 2A for the constant speed control automatically cancels the constant speed control.

The conventional constant speed control device as described above has a problem in that, during when the constant speed operation is activated, there is possibility to perform the acceleration control even in the case that the deceleration must be done inherently corresponding to the running state of the vehicle, for example, when the vehicle is turning. Such an acceleration may frighten the driver, thereby causing the driver's drivingability to be impaired.

SUMMARY OF THE INVENTION

The invention has been attained in order to solve the above-mentioned problem, and has an object of providing a constant speed control device which can perform the constant speed control in accordance with the steering angle of the vehicle and therefore improve the driver's driving ability.

The constant speed control device of the invention is so constructed that, in the above-mentioned configuration, an electronic control unit (hereinafter, so-called as "ECU") into which steering angle information from a steering angle sensor is input is connected through a transferring line (as a steering angle detecting member) with the control means for performing the constant speed control, thereby allowing the control means to receive the steering angle information.

In accordance with the steering angle information, the control means either changes the aimed vehicle speed or cancels the constant speed control.

In the constant speed control device of the invention, the control means receives the steering angle information from the transferring line to perform the constant speed control.

The control means which has received the steering angle information compares it with a threshold level, so as to change the desired vehicle speed or cancel the constant speed control.

BRIEF DESCRIPTION OF THE DRAWINGS

FIG. 2(a) shows a plot of a vehicle's speed when the constant speed control device is employed.

FIG. 2(b) shows a plot of a constant speed control signal for the constant speed control device.

FIG. 2(c) shows a plot of a signal from a main switch in the constant speed control device.

FIG. 2(d) shows a plot of a signal from a cancel/brake switch in the constant speed control device.

FIG. 2(e) shows a plot of a signal from a set switch for reactivating the constant speed control signal in the constant speed control device.

FIG. 2(f) is a chart showing a plot of the steering angle of a vehicle.

FIG. 4(a) shows a plot of a vehicle's speed when a conventional constant speed control device is employed.

FIG. 4(b) shows a plot of a constant speed control signal for a conventional constant speed control device.

FIG. 4(c) shows a plot of a signal from a main switch in a conventional constant speed control device.

FIG. 4(d) shows a plot of signal from a cancel/brake switch in a conventional constant speed control device.

FIG. 4(e) is a chart showing a plot of a signal from a set switch for reactivating the constant speed control signal, in a conventional constant speed control device.

DETAIL DESCRIPTION OF THE PREFERRED EMBODIMENT

Embodiment 1

Figure 1:
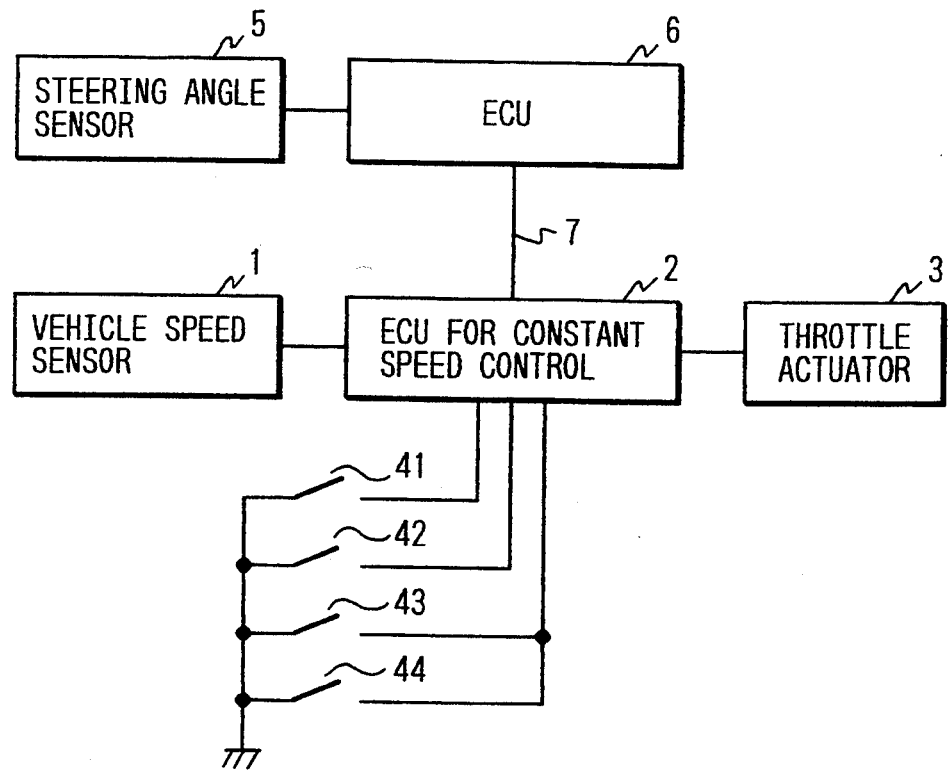
FIG. 1 is a diagram showing the configuration of a constant speed device including a constant speed control device which is an embodiment of the invention.
Figure 3:
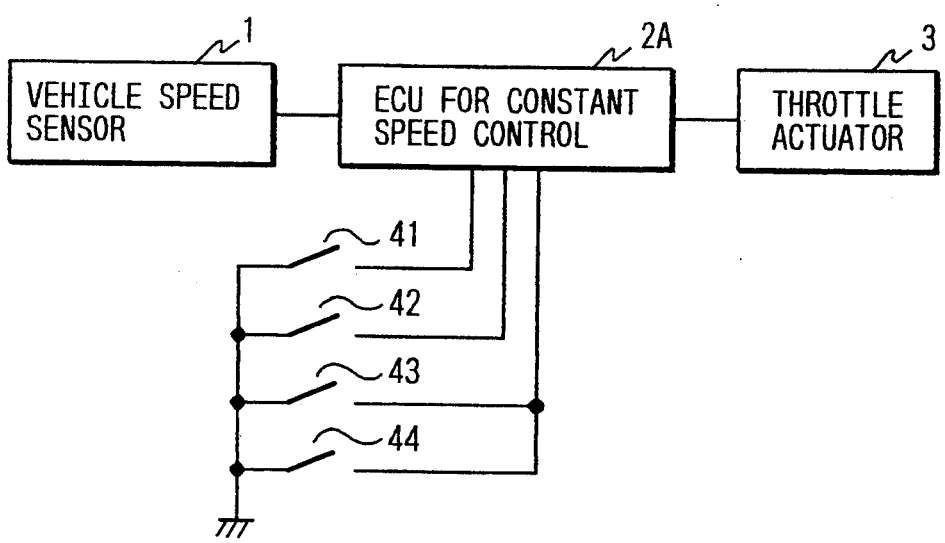
FIG. 3 is a diagram showing the configuration of a conventional constant speed control device.

FIG. 1 shows the configuration including a constant speed control device which is an embodiment of the invention. In the figure, the elements having same function with FIG. 3 are respectively designated by the same reference numerals 1, 3 and 41–44, and their description is omitted. An electronic control unit 2 for the constant speed control (hereinafter, referred to as "constant speed ECU") performs the constant speed running control on the basis of input signals. A steering angle sensor 5 detects the steering angle of a steering wheel of a vehicle and outputs steering angle information in accordance with the detected steering angle. An ECU 6, e.g. a steering control device, a suspension control device and a traction control, etc., receives an output of the steering angle sensor 5. A transferring line 7 connects the ECU 6 with the constant speed ECU 2 so that control information is transferred to each other.

The constant speed ECU 2 has an input port (not shown in FIG. 1) which is connected with the vehicle speed sensor 1, the main switch 41, the set switch 42, the cancel switch 43 and the brake switch 44, and an output port (not shown in FIG. 1) which is connected with the throttle actuator 3.

FIG. 2 shows operation timings, showing as signal wave forms, etc., of various portions of the device having the above-mentioned structure. In FIG. 2, (a) indicates the changes of the actual vehicle speed $V_r$ and the aimed vehicle speed $V_o$, (b) indicates the state of the constant speed operation, (c) indicates the state of the main switch 41, (d) indicates the state of the cancel switch 43 or the brake switch 44, (e) indicates the state of the set switch 42, and (f) indicates the steering angle or the steering angle information.

The operation of the Embodiment 1 will be described with reference to FIGS. 1 and 2. Except when the absolute value of the steering angle is equal to or greater than $\theta 1$ as a predetermined first threshold, the constant speed ECU 2 performs the constant speed control same as that of the conventional device. In order to avoid duplication, therefore, the description of the control of this case is omitted.

The steering angle sensor 5 detects the steering angle of the steering wheel of the vehicle. The detected steering angle is transferred as the steering angle information to the constant speed ECU 2 through the ECU 6 and the transferring line 7. During the constant speed operation, a renewing section (not shown) in the constant speed ECU 2 checks the steering angle information to determine whether the absolute value of the steering angle is not greater than the angle $\theta 1$. When not greater than $\theta 1$, the constant speed ECU 2 performs the constant speed control same as that of the conventional device.

The renewing section in the constant speed ECU 2 compares the steering angle information with a threshold which corresponds to the angle $\theta 1$. As a result of this comparison, when it is determined that the absolute value of the steering angle reaches the angle $\theta 1$, the aimed vehicle speed $V_o$ is reduced as shown at time $t_1$ in FIG. 2, and the constant speed control same as that of the conventional device is continued. When the absolute value of the steering angle remains smaller than an angle $\theta 2$ ($\theta 1 < \theta 2$), a predetermined second threshold and becomes again equal to or less than the angle $\theta 1$ (see time $t_2$), the aimed vehicle speed $V_o$ is raised to return to the initial value, and the constant speed control same as that of the conventional device is further continued.

Thereafter, the renewing section in the constant speed ECU 2 compares the steering angle information with a threshold which corresponds to the angle $\theta 2$, as indicated at time $t_3$ of FIG. 2. When it is determined as a result of this comparison that the absolute value of the steering angle becomes equal to or greater than the angle $\theta 2$, the constant speed control is canceled. Namely, when the vehicle turns in a relatively gentle curvature during the constant speed operation, the aimed vehicle speed is reduced in order to assure the driving safety, and, when the vehicle turns in a relatively steep curvature, the constant speed control is automatically canceled because it is dangerous to continue the constant speed control.

As was described above, in the invention, the control means for performing the constant speed control is connected through the transferring line with the electronic control unit into which steering angle information from the steering angle sensor is input, so that the transferring of the steering angle information is conducted. Therefore, the invention achieves the effects that the vehicle speed control which responds to the deceleration requirement based on the steering operation can be realized by a simple configuration, and that the driver's driving ability can be improved.

What is claimed is:

1. A constant speed control device for controlling a vehicle speed at a constant speed, said device comprising:

a vehicle speed sensor for detecting an actual vehicle speed;

a steering angle detecting means for detecting a steering angle of the/vehicle;

running condition setting means for setting at least one of an aimed vehicle speed for the constant speed control, an activation and cancellation of the constant speed control; and control means for calculating vehicle speed control variables for the constant speed control on the basis of said steering angle and a deviation between said actual vehicle speed detected by said vehicle speed sensor and said aimed vehicle speed set by said running condition setting means, to perform said constant speed control.

2. A device according to claim 1, wherein said control means is provided with renewing means for renewing the aimed vehicle speed or canceling said constant speed control in accordance with the steering angle detected by said steering angle detecting means.

3. A device according to claim 2, wherein, when the steering angle detected by said steering angle detecting means becomes equal to or greater than a first predetermined threshold, said renewing means sets the renewed aimed vehicle speed lower than the aimed vehicle speed set by said running condition setting means.

4. A device according to claim 3, wherein, when the steering angle detected by said steering angle detecting means becomes equal to or greater than a second predetermined threshold which is greater than said first threshold, said renewing means cancels the constant speed control operation.

5. A device according to claim 2, wherein, when the steering angle detected by said steering angle detecting means becomes equal to or greater than a second predetermined threshold, said renewing means cancels said constant speed control operation.

* * * * *